United States Patent [19]

Mizuhara

[11] Patent Number: 5,364,010
[45] Date of Patent: Nov. 15, 1994

[54] JOINING OF METAL TO CERAMIC BODIES BY BRAZING

[75] Inventor: Howard Mizuhara, Hillsborough, Calif.

[73] Assignee: The Morgan Crucible Company, plc, Windsor, England

[21] Appl. No.: 943,884

[22] Filed: Sep. 11, 1992

Related U.S. Application Data

[63] Continuation-in-part of Ser. No. 548,394, Jul. 5, 1990, Pat. No. 5,152,449.

[51] Int. Cl.⁵ .................................. B23K 31/02
[52] U.S. Cl. ................... 228/124.6; 228/248.5; 228/124.5
[58] Field of Search ............ 228/263.12, 248, 212, 228/122, 124, 248.5, 122.1, 124.1, 124.5, 124.6

[56] References Cited

U.S. PATENT DOCUMENTS

| | | | |
|---|---|---|---|
| 2,728,425 | 12/1955 | Day | 228/122 |
| 3,001,269 | 9/1961 | Moore | 228/263.12 |
| 3,049,792 | 8/1962 | Kohl | 228/122 |
| 4,011,099 | 3/1977 | Gutsche | 51/317 |
| 4,630,767 | 12/1986 | Mizuhara | 228/122 |
| 4,711,386 | 12/1987 | Mizuhara | 228/122 |
| 4,714,189 | 12/1987 | Tovey | 228/122 |
| 4,735,866 | 4/1988 | Moorhead | 228/122 |
| 4,917,642 | 4/1990 | Nakahashi | 228/122 |
| 4,972,989 | 11/1990 | Black | 228/248 |
| 5,186,380 | 2/1993 | Beeferman | 228/248 |

FOREIGN PATENT DOCUMENTS

0015874  1/1990  Japan ........................ 228/122

OTHER PUBLICATIONS

*Welding Journal Article*, Ceramic to Metal Joining with Active Brazing Filler Metal, Mizuhara et al. Oct. 1985 pp. 27–32.
*Ceramic Age Articles*, High Temperature Metal Ceramic Seals. Bender Apr. 1954 pp. 15,48,49,50.

*Primary Examiner*—P. Austin Bradley
*Assistant Examiner*—James Miner
*Attorney, Agent, or Firm*—Kilpatrick & Cody

[57] ABSTRACT

A method for joining a metal body to a ceramic body in abutting relationship is disclosed. This method includes the steps of directly applying a brazing paste to a bonding area of a ceramic body without the use of a brazing preform, contacting a metal body to the bonding area of the ceramic body, and heating and cooling to form a braze fillet between the metal and ceramic bodies. The particular feature of the method is that the brazing pastes will wet and coat the entire bonding area of the ceramic body which is to be joined to the metal body.

26 Claims, 2 Drawing Sheets

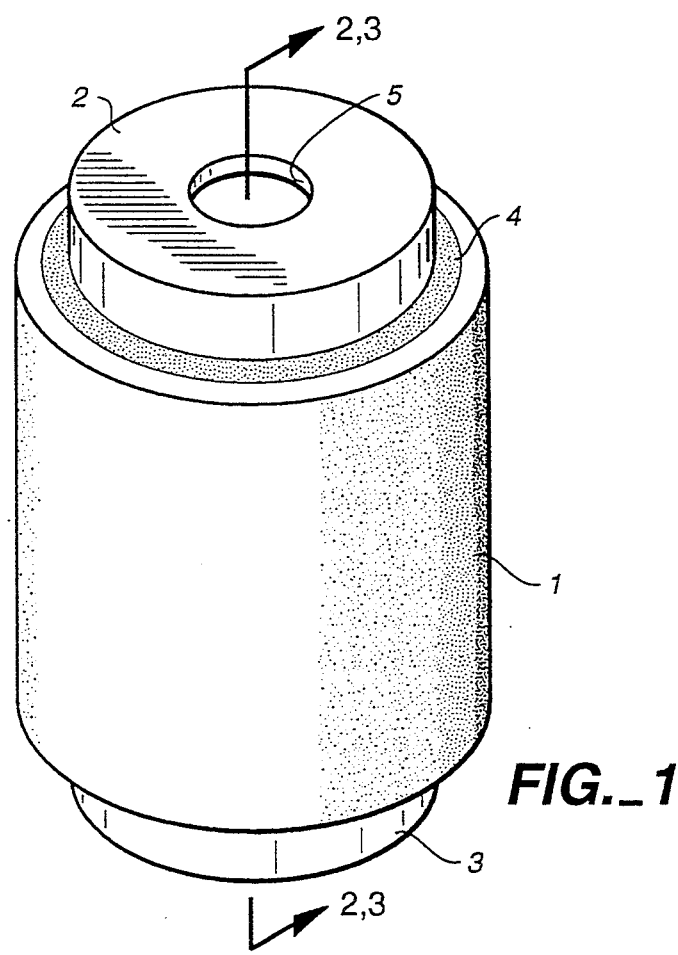
FIG._1
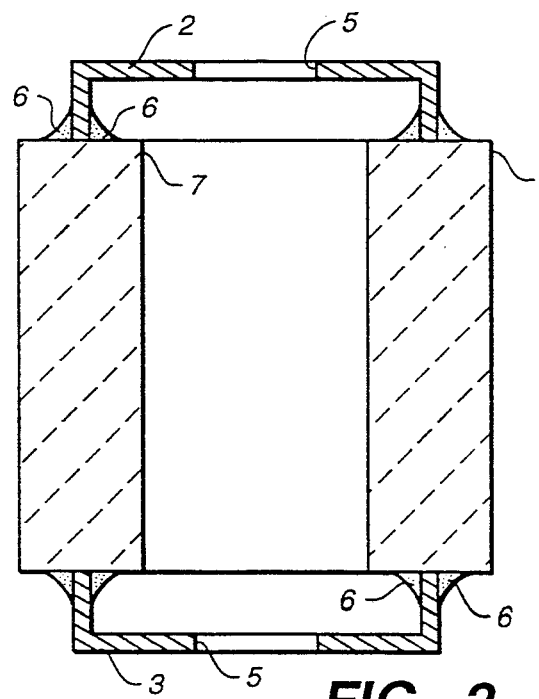
FIG._2
(PRIOR ART)
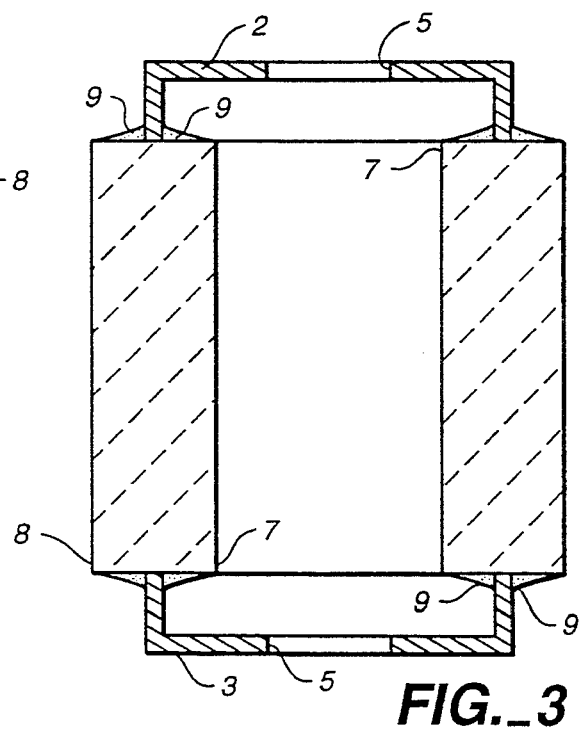
FIG._3

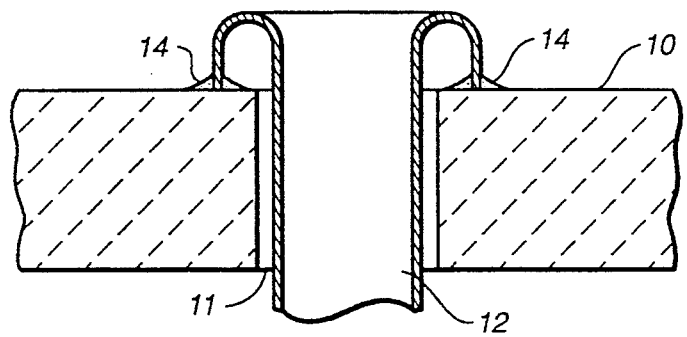
FIG._4
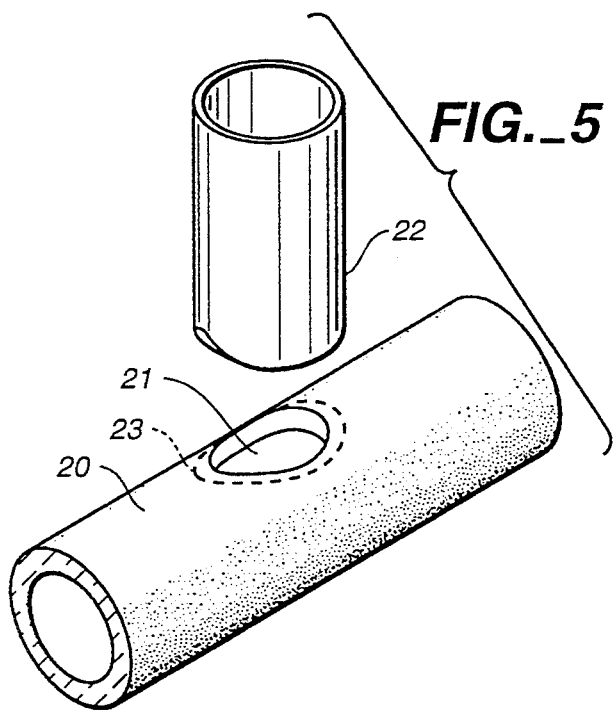
FIG._5
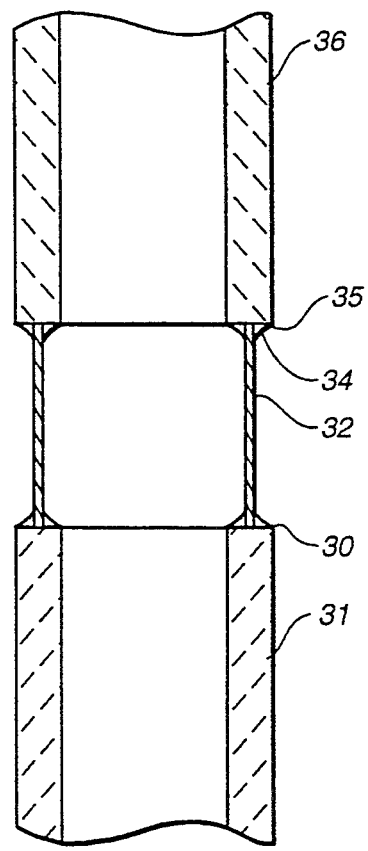
FIG._6
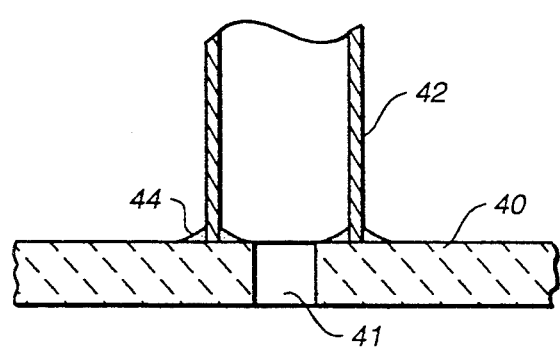
FIG._7

JOINING OF METAL TO CERAMIC BODIES BY BRAZING

This application is a continuation-in-part of application U.S. Ser. No. 548,394, filed Jul. 5, 1990 now U.S. Pat. No. 5,152,449.

FIELD OF THE INVENTION

This invention relates generally to bonding metal bodies to ceramic bodies with brazing metals. More particularly, the invention relates to a method of using a combination of a brazing paste of an active metal and a filler alloy which combination is very effective for wetting and coating the joint surface of the ceramic body to be joined to the metal body and to the metal to ceramic assemblies resulting therefrom.

BACKGROUND OF THE INVENTION

A number of methods are available in the prior art for bonding metal bodies to ceramic bodies. One example of such methods includes the use of a brazing method in which a preform of suitable active brazing metals are placed between the ceramic and metal bodies. The preform is thin, on the order of about six mils, and is applied to the ceramic body joint surface having an area which is larger in extent to the metal body joint surface to be bonded thereto. The two joint surfaces are of substantially identical curvature. One of problems of the prior art methods is the brazing metals do not wet the entire joint bonding surface of the ceramic body so that any thermal mismatch stress between the metal and the ceramic bodies can be distributed across the entire ceramic body joint surface. This problem can be due to too fast a heating cycle which results in the temperature of the metal body rising more rapidly than the temperature of the ceramic body. Another problem associated with the use of a preform brazing alloy is brazing a metal body to an inverted ceramic body bonding surface such as the lower end surfaces of the ceramic body. In such instances, the preform will sag away from the ceramic body as the preform melts resulting in non-uniform and substantially weaker brazing fillets.

U.S. Pat. No. 4,917,642 discloses various methods of bonding metal cover members to ceramic tubular members via brazing. One method comprises preparing a mixture of an active metal powder such as Ti and/or Zr, an organic binder such as polyvinyl alcohol and ethyl cellulose and a solvent such as ethanol and tetralin and applying the mixture on the bonding surface of the ceramic tubular member through a metal mesh screen and the like. An Ag-brazing filler metal preform or foil is placed on the ceramic member's joint bonding surface coated with the active metal. The metal cover member is then placed onto the brazing filler metal foil before the resulting ceramic to metal assembly is heated and cooled to form the desired bond. This prior art method has the disadvantages noted above in the use of a brazing preform.

SUMMARY OF THE INVENTION

This invention concerns an improved method for bonding a metal body to a ceramic body and reduces the disadvantages associated with prior art bonding methods. In this method, a brazing paste, consisting of a finely powdered active metal and brazing filler alloy in a liquid vehicle, is applied to a joint bonding surface of the ceramic body. The metal body joint bonding surface is placed in contact with the brazing paste covered area to form an assembly of the metal body, brazing paste and ceramic body. The assembly is heated to melt the paste which in turn wets the bonding surface of the ceramic body and is then cooled to form a brazing fillet bonded between the bonding surfaces of the metal and ceramic bodies.

This method of this invention provides a means of bonding a metal body to a ceramic body which ensures that the joint bonding surface of the ceramic body will be wet by the brazing metals. This method permits a wide latitude in the heating rate used to form the braze without causing a problem of non-uniform wetting of the entire joint surface of the ceramic body. This method is particularly effective in brazing the lower end of a ceramic body without the problem of sagging that occurs with the use of brazing alloy preforms. In this invention, instead of using a brazing preform, a paste of the finely divided active metal and brazing filler alloy is applied, for example, by screening, extrusion and the like, to the joint bonding surface of the ceramic body. The brazing paste is applied directly to the bonding surface without the use of an intermediate preform. The metals in the paste melts upon heating to at or near the liquidus temperature for the brazing alloy, i.e. temperatures in the range of about 800° to about 1000° C., will wet and coat the entire joint bonding surface of the cylinder, even for a fast heating cycle and even on a lower end surface or other inverted bonding surface.

BRIEF DESCRIPTION OF THE DRAWINGS

FIG. 1 is a view of a ceramic cylinder having an end cap brazed at each end, such as would be used in a vacuum switch;

FIG. 2 is a sectional view showing an example of a poor braze in which the entire end surface of the cylinder is not coated;

FIG. 3 is a sectional view showing a good braze, the entire end surface being coated by braze metal;

FIG. 4 is a sectional view showing an inverted metal tube end brazed at one end to an opening in a ceramic flat surface;

FIG. 5 is a view of a metal tube in the process of being brazed to an opening in the wall of a ceramic tube;

FIG. 6 is a sectional view of an end of a metal tube brazed to an end of a ceramic tube; and FIG. 7 is a sectional view of a metal tube brazed to a hole in a ceramic flat surface.

DETAILED DESCRIPTION OF THE INVENTION

One embodiment of a brazed assembly in accordance with this invention, as shown in FIG. 1, comprises a ceramic cylinder 1 having a top end cap 2 and a bottom end cap 3 brazed thereto, there being a braze fillet 4 at the junction of the cylinder and end cap. In one example, ceramic cylinder 1 was made of alumina, was 3" long, had an outside diameter of 4" and an inside diameter of 3½" for a wall thickness of ¼". End caps 2 and 3 were made of 45 mil thick stainless steel and were shaped like a shallow cup with a hole 5 therethrough. End caps 2 and 3 were 3¾" in diameter and had a height of ½". In order to braze end caps 2 and 3 to cylinder 1, a brazing paste was used. The brazing paste consisted of brazing metal powder dispersed in a liquid vehicle of 3% solution of hydroxylpropylcellulose and 97% 1,2-propanediol. Such a brazing paste is disclosed in U.S. Pat. No. 4,919,730. The paste was applied to both ends of cylinder 1 and then end caps 2 and 3 were concentrically positioned thereon. FIG. 3 shows that end caps 2 and 3 are substantially equidistant from the inside and outside walls of ceramic cylinder 1. This positioning of the end caps relative to the ceramic cylinder is preferred. However, the use of the brazing pastes in accordance with the method of the present invention greatly reduces the necessity of such position because of the uniformity of wetting of the entire bonding surface of the ceramic cylinder. The assembly of cylinder 1 and end caps 2 and 3 were vertically held in a suitable jig throughout the brazing cycle.

FIG. 2 shows an example of a poor braze. Braze fillet 6, which rides up a little too high on end caps 2 and 3, is a poor braze primarily because the braze coating does not extend all the way out to inner edge 7 and/or outer edge 8 of cylinder 1.

FIG. 3 shows an example of a good braze. Fillet 9 is not quite as high as in FIG. 2 and the braze coating extends all the way out to inner edge 7 and outer edge 8 of cylinder 1. Thus the entire end surfaces of cylinder 1 are coated with brazing metal.

FIG. 4 shows another embodiment of a brazed assembly in accordance with this invention. Flat ceramic surface 10 having opening 11 through which is mounted an inverted metal tube 12, with a braze fillet 14 at the joint surface surrounding hole 11 and that of the curved end of tube 12. Because brazing large components in a vacuum furnace is difficult, the brazed assembly shown in FIG. 4 offers a solution. The basic bonding of ceramic surface 10 is to a relatively short metal tube 12 in a vacuum furnace. One or a series of metal tubes (not shown) can then be TIC (tungsten inert gas) welded to metal tube 12 outside the vacuum furnace. In order to prevent over stressing of the ceramic-metal joint 14 from the heat generated by welding, the metal tubes are TIG welded a sufficient distance from joint 14.

FIG. 5 shows an embodiment in accordance with this invention in which ceramic tube 20 having opening 21 is in the process of being joined to a metal tube 22, with a braze fillet, not shown, at the joint surface 23 surrounding opening 21 of tube 22.

FIG. 6 shows a further embodiment of a brazed assembly in accordance with this invention in which one end 30 of ceramic tube 31 is joined to one end of a metal tube 32, with a braze fillet 34 at the junction of tube 30 and metal tube 32. The other end of metal tube 32 is joined to end 35 of ceramic tube 36. The brazed assembly of FIG. 6 is very useful in producing a compliant joint between two cylinders of different ceramic compositions having different coefficients of thermal expansion, e.g. joining a alumina cylinder to a partially stabilized zirconia cylinder. In the event the two ceramic cylinders are of different diameters, metal compliant tube 32 can be spun so that each end is of the same complimentary diameters.

FIG. 7 shows a still further embodiment of a brazed assembly in accordance with this invention in which flat ceramic surface 40 having hole 41 is mounted to a metal tube 42, with a braze fillet 44 at the joint surface surrounding hole 41. The brazed assembly of FIG. 7 are useful in combustion tubes. In such an application, a flat or hemispherical ended combustion tube requires such a ceramic-metal tube joint for the ceramic portion of the joint exposed to high temperatures. A braze alloy paste is selected to meet the highest temperature such a braze joint will be exposed to.

In a preferred embodiment of the method of the present invention, the brazing paste comprises 1–4% by weight of an active metal and 96–99% by weight of the brazing filler metals. Preferably the active metal is titanium. In a more preferred embodiment, the active metal is titanium hydride and the brazing filler metals are ternary alloys such as silver-copper-tin, silver-copper-indium, silver-copper-aluminum, and aluminum-copper-silicon. In a still more preferred embodiment, the ternary brazing filler alloy has a composition substantially comprised of, in weight percent: 62–65.5% Ag, 33.25–36% Cu and 0.75–1.5% Sn or 58–61% Ag, 26.25–29% Cu and 12–13.25% In or 92.25–95% Ag, 4.5–6% Cu and 0.75–1.5% Al or 92.25–95% Cu, 1.75–2.5% Al and 2.75–3.5 Si. These alloys are commercially available from Wesgo, Inc., a division of The Morgan Crucible Company, plc. The preferred composition of the brazing fillet in the finished assembly has a composition substantially comprised of, in weight percent: Ag, 33.25–35.25% Cu, 0.75–1.25% Sn and 1.5–2.0% Ti or 58–60% Ag, 26.25–28.25% Cu, 12–13% In and 1–1.5% Ti or 92.25–93.25% Ag, 4.5–5.5% Cu, 0.75–1.25% Al and 1–1.5% Ti or 92.25–93.25% Cu, 1.75–2.25% Al, 2.75–3.25 Si and 2–2.5% Ti.

The ceramics to which the brazing metals of this invention bond include high-purity, high-density aluminas, alumina-matrix and mullite-matrix composites as well as partially stabilized zirconias, silicon nitride and silicon carbide. The alumina can contain typical additives as sintering aids such as silica, calcia and magnesia.

The metal in the metals bodies can include stainless steel, cupronickel, nickel-plated steel, iron-nickel-cobalt alloys (Kovar TM), titanium, titanium alloys, niobium, niobium alloys and copper.

EXAMPLE 1

In this example, the brazing metal that was used consisted of minus 325 mesh powder of Ag-Cu-Sn alloy mixed with minus 325 mesh titanium hydride powder so that the brazed composition consisted of, in weight percent, 63 Ag, 34.25 Cu, 1 Sn, 1.75 Ti. The paste consisted of 90% by weight of powder and 10% by weight of a screening oil. The paste was applied to the ends of alumina cylinder 1 by screening through an 80 mesh screen at a distance of 60 mils. Two coatings were applied to yield a 12 mil layer of dried paste, which is equivalent to about a 6 mil preform thickness on melting. Prior to coating the ends of cylinder 1, cylinder 1 was heated at 1500° to 1600° C. in order to heal any grinding surface flaws that may have existed on the bonding surfaces of cylinder 1. End caps 2 and 3, made of type 430 stainless steel, were assembled to coated cylinder 1, and the assembly was brazed in a vertical position at 825° C. under $10^{-5}$ torr vacuum. An excellent braze resulted, with complete coverage of the end surfaces of cylinder 1.

EXAMPLE 2

In this example, the brazing metal consisted of minus 325 mesh powder of an alloy of, in weight percent, 59.5 Ag, 27.8 Cu, 12.7 In, mixed with 1% by weight of minus 325 mesh TiH$_2$. The paste consisted of 90% by weight brazing metal powder and 10% by weight screening oil. The end caps were made of cupronickel (70% Cu, 30% Ni). The braze was made at 720° C. under $10^{-5}$ torr vacuum. An excellent braze resulted which met the helium leak test of less than $10^{-9}$ cc/sec leak rate.

EXAMPLE 3

This example was similar to that of Example 2 except that the end caps were made of nickel-plated type 1010 steel instead of cupronickel. Also, grinding flaws were eliminated by lapping off about 3 mils from each face, instead of firing at 1600° C.

EXAMPLE 4

In this example the metal powder consisted of 97% by weight of minus 325 mesh atomized powder of an alloy of, in weight percent, 94.6 Cu, 2.1 Al, 3.3 Si, and 3% by weight of minus 325 mesh $TiH_2$. The paste consisted of 90% by weight of the metal powder and 10% by weight of screening oil. The end caps were made of Kovar, an iron-nickel-cobalt alloy made by Westinghouse Electric Corporation. The brazing was at 1030° C. under $10^{-5}$ torr vacuum. An excellent braze resulted.

EXAMPLE 5

In this example, an alloy of 94% Ag, 5% Cu and 1% Al (weight %) is prepared by atomizing, followed by screening out the minus 325 mesh powder. 98.75% by weight of the minus 325 mesh atomized powder of the alloy of, in weight percent, Ag-Cu-Al is blended with 1.25% by weight of minus 325 mesh $TiH_2$. 90% by weight of the resulting metal powder is mixed with 10% by weight of screening oil to prepare the screening mix. A 105 mesh pattern screen with a washer pattern is used to deposit a pattern of the brazing paste concentrically around hole 41 in a flat as-fired alumina plate 40 having a thickness of 2 cm. as shown in FIG. 7. A short right cylinder 42 comprising 1010 steel having a thickness of 10 mil is placed in the center of the washer pattern. The assembly is heated under $10^{-5}$ Torr vacuum to 950° C. for 10 minutes followed by cooling to room temperature at a rate of 5° C. The brazed assembly is tested with a helium mass spectrograph and is found to have a vacuum grade seal of less than $10^{-9}$ cc/sec. leak.

What is claimed is:

1. A method of joining a metal tube to a ceramic body, the metal tube and ceramic body having joint bonding surfaces of substantially identical curvature, the ceramic body joint bonding surface being larger in extent than the metal tube joint bonding surface and the metal tube joint bonding surface comprising a lip to an open end of the tube, the method comprising the steps of:
   (a) applying a brazing paste consisting of a finely powdered combination of an active metal and a brazing filler metal in a liquid vehicle to the ceramic body joint bonding surface over an area larger than the metal tube joint bonding surface to form a brazing paste covered area of the ceramic body bonding surface;
   (b) contacting the metal tube joint bonding surface with the brazing paste covered area so as to form an assembly of metal tube, brazing paste, and ceramic body;
   (c) heating the assembly to a temperature to melt the brazing paste whereby the melted brazing paste wets the ceramic body joint bonding surface and the metal tube joint bonding surface to form a braze fillet between the metal tube joint bonding surface and the ceramic body joint bonding surface, the braze covering and bonding to the ceramic body joint bonding surface; and
   (d) cooling the assembly.

2. The method of claim 1 wherein said ceramic body joint bonding surface lies above the metal tube joint bonding surface during the heating step.

3. The method of claim 1 wherein the brazing paste is applied by screening.

4. The method of claim 1 wherein the brazing paste is applied by extrusion.

5. The method of claim 1 wherein said active metal is titanium hydride.

6. The method of claim 1 including the step of firing the ceramic body joint bonding surface, prior to the coating step, at a temperature of 1500° to 1600° C. in order to heal any grinding surface flaws on the ceramic body bonding surface.

7. The method of claim 1 wherein said brazing paste has a composition substantially comprised of, in weight percent: 1-4% of said active metal and 96-99% of said brazing filler metal.

8. The method of claim 7 wherein said active metal is titanium hydride.

9. The method of claim 8 wherein said brazing filler metal has a composition substantially comprised of, in weight percent: 62-65.5% Ag, 33.25-36% Cu and 0.75-1.5% Sn.

10. The method of claim 8 wherein said brazing filler metal has a composition substantially comprised of, in weight percent: 58-61% Ag, 26.25-29% Cu and 12-13.25% In.

11. The method of claim 8 wherein said brazing filler metal has a composition substantially comprised of, in weight percent: 92.25-95% Ag, 4.5-6% Cu and 0.75-1.5% Al.

12. The method of claim 8 wherein said brazing filler metal has a composition substantially comprised of, in weight percent: 92.25-95% Cu, 1.75-2.5% Al and 2.75-3.5 Si.

13. The method of claim 1 wherein said brazing filler metal is selected from the group consisting of silver-copper-tin, silver-copper-indium, silver-copper-aluminum, and aluminum-copper-silicon.

14. The method of claim 13 wherein the metal in said metal tube is selected from the group consisting of stainless steel, cupronickel, nickel-plated steel, iron-nickel-cobalt alloy and copper.

15. The method of claim 1 including the step of lapping the ceramic body joint bonding surface, prior to the coating step, at in order to remove any grinding surface flaws on the ceramic body bonding surface.

16. The method of claim 1 wherein the ceramic body is a cylinder and the ceramic body joint surface is an end surface of the cylinder.

17. The method of claim 1 wherein the ceramic body is a ceramic tube and the ceramic body joint surface is the surface surrounding a hole in the tube.

18. The method of claim 1 wherein the ceramic body is a ceramic tube and the ceramic body joint bonding surface is the surface surrounding one end of the tube.

19. The method of claim 18 wherein the metal tube forms an end cap to the ceramic tube.

20. The method of claim 19 wherein the end cap comprises a shallow cup with an aperture therethrough.

21. The method of claim 1 wherein the ceramic body is a flat plate and the ceramic body joint bonding surface is the surface surrounding a hole in the plate.

22. The method of claim 21 wherein the metal tube lip which forms the metal tube joint bonding surface is everted and in which the tube passes through the hole in the plate.

23. A method of joining a pair metal tubes to opposed sides of a ceramic body, the metal tubes and ceramic body having respective joint bonding surfaces of substantially identical curvature, the ceramic body joint bonding surfaces being larger in extent than the respective metal tube joint bonding surfaces and the metal tube joint bonding surfaces comprising lips to open ends of the tubes, the method comprising the steps of:
  (a) applying a brazing paste consisting of a finely powdered combination of an active metal and a brazing filler metal in a liquid vehicle to the ceramic body joint bonding surfaces over areas larger than the respective metal tube joint bonding surfaces to form brazing paste covered areas of the ceramic body joint bonding surface;
  (b) contacting the metal tube joint bonding surfaces with the respective brazing paste covered areas so as to form an assembly of metal tube, brazing paste, and ceramic body;
  (c) heating the assembly to a temperature to melt the brazing paste whereby the melted brazing paste wets the ceramic body joint bonding surfaces and the metal tube joint bonding surfaces to form braze fillets between the metal tube joint bonding surfaces and the respective ceramic body joint bonding surfaces, the braze covering and bonding to the ceramic body joint bonding surfaces; and
  (d) cooling the assembly.

24. The method of claim 23 in which the ceramic body is a ceramic tube, and the ceramic body joint bonding surface is a lip to an open end of the tube.

25. A method of joining a pair of ceramic bodies to opposed ends of a metal tube, the metal tube and ceramic bodies having respective joint bonding surfaces of substantially identical curvature, the ceramic bodies having ceramic body joint bonding surfaces larger in extent than the respective metal tube joint bonding surfaces and the metal tube joint bonding surfaces comprising lips to open ends of the tubes, the method comprising the steps of:
  (a) applying a brazing paste consisting of a finely powdered combination of an active metal and a brazing filler metal in a liquid vehicle to the ceramic body joint bonding surfaces over areas larger than the respective metal tube joint bonding surfaces to form brazing paste covered areas of the ceramic body joint bonding surface;
  (b) contacting the metal tube joint bonding surfaces with the respective brazing paste covered areas so as to form an assembly of metal tube, brazing paste, and ceramic body;
  (c) heating the assembly to a temperature to melt the brazing paste whereby the melted brazing paste wets the ceramic body joint bonding surfaces and the metal tube joint bonding surfaces to form braze fillets between the metal tube joint bonding surfaces and the respective ceramic body joint bonding surfaces, the braze covering and bonding to the ceramic body joint bonding surfaces; and
  (d) cooling the assembly.

26. The method of claim 25 in which the ceramic bodies are ceramic tubes, and the ceramic body joint bonding surfaces are lips to open ends of the tubes.

* * * * *

UNITED STATES PATENT AND TRADEMARK OFFICE
CERTIFICATE OF CORRECTION

PATENT NO. : 5,364,010

DATED : November 15, 1994

INVENTOR(S) : Howard Mizuhara

It is certified that error appears in the above-indentified patent and that said Letters Patent is hereby corrected as shown below:

Column 3, line 34, delete "TIC" and insert --TIG--

Column 4, line 39, delete "ahoy" and insert --alloy--

Column 8, line 8, delete "tubes" and insert --tube--

Column 8, line 16, delete "surface" and insert --surfaces--

Signed and Sealed this

Thirteenth Day of May, 1997

Attest:

BRUCE LEHMAN

*Attesting Officer*          *Commissioner of Patents and Trademarks*